United States Patent

[11] 3,571,747

[72] Inventors Barry R. Bronfin;
 Wayne G. Burwell, Wethersfield; Russell G. Meyerand, Jr., Glastonbury; Edward N. Hall, Bloomfield, Conn.
[21] Appl. No. 710,699
[22] Filed Feb. 23, 1968
[45] Patented Mar. 23, 1971
[73] Assignee United Aircraft Corporation
 East Hartford, Conn.

[54] GAS INJECTION LASER
 4 Claims, 7 Drawing Figs.
[52] U.S. Cl. .................................................. 331/94.5, 330/4.3
[51] Int. Cl. ................................................. H01s 3/09
[50] Field of Search ...................................... 331/94.5

[56] References Cited
UNITED STATES PATENTS
3,302,127 1/1967 Lin .............................. 331/94.5
OTHER REFERENCES
Hurle et al, ELECTRONIC POPULATION INVERSION BY FLUID-MECHANICAL TECHNIQUES, in " The Physics of Fluids," Sept. 1965, pp. 1601— 06

Patel (I), " Selective Excitation Through Vibrational Energy Transfer and Optical Maser Action in N 2-CO 2," in Physical Review Letters, Vol. 13, Nov. 23, 1964, pp. 617— 619 relied on
Patel (II), " CW Laser Action in N 2O(N 2-N 2O System)," in Applied Physics Letters, Vol. 6, Jan. 1, 1965, pp 12— 13 relied upon Primary Examiner—Rodney D. Bennett, Jr.
Assistant Examiner—Daniel C. Kaufman
Attorney—Melvin Pearson Williams ABSTRACT: A relatively cool lasing gas such as $CO_2$ is injected into a gas such as $N_2$ which is energized sufficiently to raise the energy of the lasing gas to an upper lasing level. The lasing substance injection occurs within an optical cavity which is oriented transversely to the flow of energizing gas, thus insuring maximum utilization of stimulated photon emission which arises from collisions of the lasing substance with the energized gas within the cavity. Energy may be imparted into the energizing gas through the application of heat from an external source. Collisional depopulation of the lower laser level of the lasing gas is optimized by maintaining the lasing area cool, where the mix occurs, such as by expansion of the energizing gas just before it enters the optical cavity.

INVENTORS
BARRY R. BRONFIN
WAYNE G. BURWELL
RUSSELL G. MEYERAND, JR.
EDWARD N. HALL

BY Melvin Pearson Williams
ATTORNEY

GAS INJECTION LASER

CROSS REFERENCE TO RELATED APPLICATIONS

A system for injecting solid lasting substance in a gas mixing laser is disclosed in a copending application of the same assignee entitled "Controlled Mixing in Gas Lasers by Injection of Solid Particles of Lasing Substance," filed on even date herewith by C. M. Banas et al. Ser. No. (UAC Docket No. R-1177). A gas mixing laser with electric excitation is shown in a copending application of the same assignee filed on even date herewith by C. O. Brown et al. entitled "Electrically Excited Gas Mixing Laser," Ser. No. (UAC Docket No. R-1229). A system for mixing a lasing substance, with adjustability, is disclosed in a copending application of the same assignee filed on even date herewith by E. A. Pinsley et al. entitled "Internal Injection System for Gas Mixing Laser," Ser. No. (UAC Docket No. R-1228).

BACKGROUND OF THE INVENTION

1. Field of Invention

This invention relates to gas lasers, and more particularly to improvements in the energization of a lasing gas and in utilization of the stimulated photon emission thereof.

2. Description of the Prior Art

Recent experimental investigations into gas lasers have shown that photon emission necessary for laser operation may be achieved by the resonant transfer of energy, through collisions, from a first gaseous substances, designated the "energizing substance" such as vibrationally excited molecular nitrogen ($N_2$), to a second substance designated the "lasing substance" such as carbon dioxide ($CO_2$). These experiments have shown that nitrogen and $CO_2$ (and perhaps additional substances, as described hereinafter) may be fully mixed together, such as in a fully mixed gaseous plasma, while the substances in this mixture are raised to respective specific energy levels, favorable to laser emission, as a result of the electron collisions in an electronic plasma. Also, it has been known to combust a complex substance such as cyanogen so as to generate carbon dioxide and molecular nitrogen with the molecular nitrogen in a highly energized state favorable to energizing the $CO_2$ for laser emission. In either case, it is necessary that the nitrogen have sufficient energy in its vibrational mode so as to impart a substantial amount of energy to $CO_2$ in the 001 state, which is commonly referred to as the upper laser level for $CO_2$ molecules, The very efficient energy transfer between the nitrogen and the carbon dioxide results from a near identity of the energy spacing of certain of the vibrational states of these two substances.

Thus, in the present state of the high power gas laser art, lasing (which is the coherent stimulated emission of quanta of light energy) of one substance results from that substance being brought to a high, nonequilibrium energy state as a result of collisions with an energizing gas excited to a vibrational energy level which closely matches an energy level of the lasing substance (i.e., the upper lasing level in $CO_2$). Simply stated, at least one $CO_2$ molecule which is present in a region of population inversion will spontaneously emit a photon with an energy equal to the difference between the upper laser energy level and the lower laser energy level for a $CO_2$ molecule. This is a quantum of light energy which is reflected back and forth in the optical cavity. The photon will impinge on another $CO_2$ molecule and cause a rapid, stimulated emission of a second photon. This photon is also reflected back and forth in the optical cavity, and so forth, which brings about a continuing avalanche of stimulated photon emission, at the lasing wavelength. This sequence will occur nearly instantaneously so that lasing is established in, say, nanoseconds. The useful laser output is derived by coupling light energy out of the oscillating and/or amplifying optical cavity.

Gas lasers heretofore available, such as those utilizing $CO_2$ and $N_2$, are limited in power output which is achievable thereby. It is believed that this is due in part to the very low efficiency of existing devices when comparing the laser output power to the amount of power required in exciting the energizing gas in order to achieve such output power. It is also believed to be due in part to the fact that many such devices have a high rate of energy absorption within them which causes the emitted light to be reabsorbed by particles in the device, thereby reducing the available output power. Furthermore, it is necessary that the lasing substance not become populated (that is, saturated) at the lower laser level so that the tendency for molecules of the lasing substance at the upper lasing level to emit a photon and achieve the lower lasing of energy is diminished.

The foregoing description has been in terms of gas laser systems utilizing vibrational energy states for the resonant transfer of energy between the energizing gas and a lasing gas. However, it is also known that gas lasers will operate when the excitation of the energizing gas and the transfer of energy therefrom to the lasing substance is at certain electronic energy levels. One such system is the helium-neon gas laser. Such a system has problems similar to those discussed hereinbefore with respect to the vibrational-state type of laser systems.

To simplify the terminology herein, the initially excited substance is referred to hereinafter as the energizing gas, and the substance which becomes energized by resonant transfer of energy from the energizing gas so as to achieve an inverted, nonequilibrium population is called the lasing substance.

SUMMARY OF INVENTION

The principal object of the present invention is to provide a high power laser.

According to the present invention, a lasing substance is nonisothermally mixed with an excited energizing gas in a gas laser. In further accord with the present invention, an excited energizing gas is flowed through the optical cavity of a laser, and a lasing substance is injected into the flow substantially uniform along the entire length of the same optical cavity. In accord still further with the present invention, the flow of energizing gas is transverse to the axis of the optical cavity. In accordance more specifically with the present invention, a flow of energizing gas is excited to a suitable degree by the application of heat thereto, the flow of energizing gas passing through the optical cavity of a laser, and a lasing substance is injected into the flow of energizing gas within the optical cavity.

The present invention minimizes losses in the population of the upper laser states which can exist when the excited energizing gas excites the lasing substance by collisions, and subsequent to the energizing collision, but prior to entrance into the region of the optical cavity, a portion of the population of the upper laser state is lost through various optical or collisional deactivation processes. Such lost upper laser state populations are hence unavailable for laser output. These losses may be termed "prelasing relaxation processes." Also, the nonisothermal injection of the lasing substance within the lasing region, with the lasing substance initially at a relatively low energy level, enhances the transfer of energy from the energizing gas to the lasing substance.

Additionally, since the lasing substance is not preenergized (as is true when a mixture of the lasing substance and the energizing gas are energized together), there is less population of the lower lasing level of the lasing substance so that there is less chance of reaching laser saturation.

Since the intense excitation of the energizing gas is separate from that of the lasing substance, there is no danger of destroying or decomposing the lasing substance, which permits selection of a much wider variety of lasing substances.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 5 is a simplified side elevation of still another variation of the embodiments of FIGS. 1 and 2 illustrating the use of external combustion as a source of heat;

DESCRIPTION OF THE PREFERRED EMBODIMENT

Figure 1:
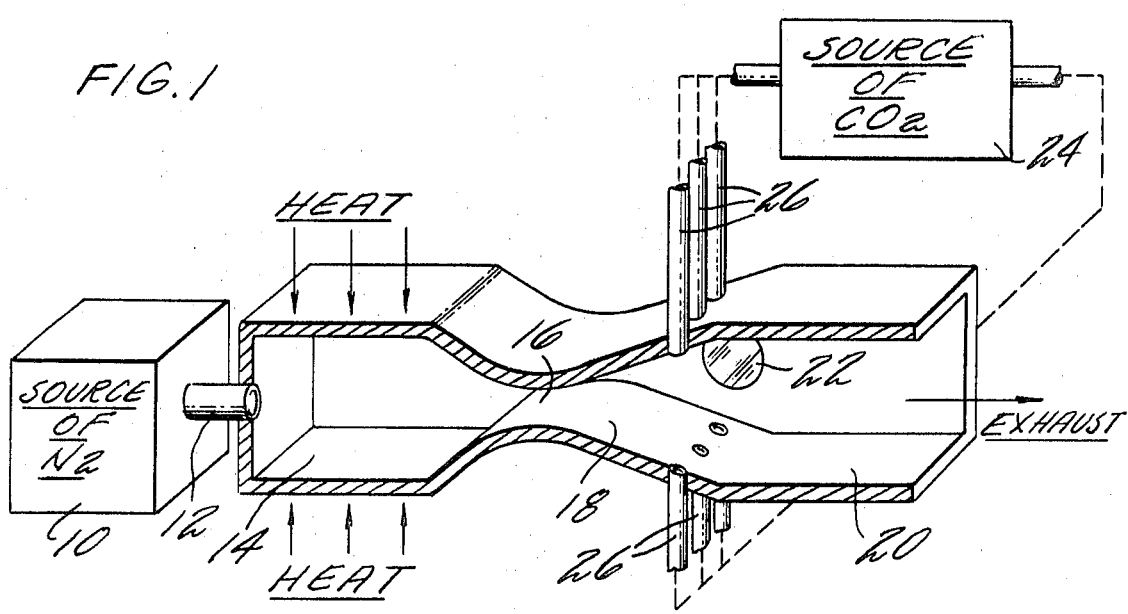
FIG. 1 is a simplified, sectioned perspective of a gas laser in accordance with the present invention.
Figure 2:
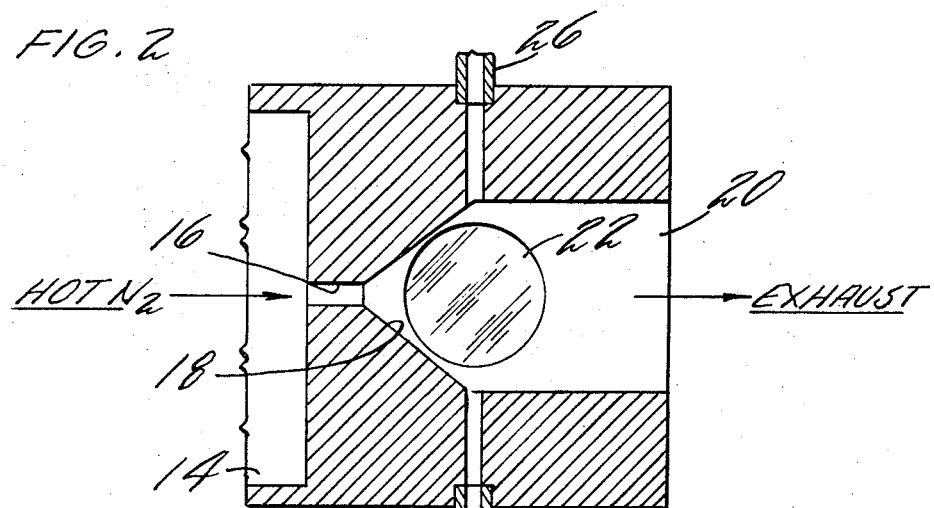
FIG. 2 is a simplified, sectioned side elevation of the chamber portion of the apparatus of FIG. 1.

An illustrative embodiment of the invention, as shown generally in FIG. 1 with schematized detail illustrated in FIG. 2, includes a source of molecular nitrogen gas 10 connected via a pipe 12 to a plenum chamber 14 within which the nitrogen may be heated. The heated nitrogen then flows through a throat 16 and an expansion area 18 into a laser chamber 20. An optical cavity system 22 (only one end of which is shown in FIGS. 1 and 2 for simplicity) is mounted transversely of the flow of nitrogen at the downstream end of the expansion area 18. The gaseous flow is permitted to exhaust at the extreme right-hand end of the system as shown in FIGS. 1 and 2.

A source of carbon dioxide 24 is connected via distribution ducts 26 to inlets into the expansion area of the nozzle, just upstream of the center line of the optical system 22.

In operation, nitrogen is passed from the source 10 to the duct 12 and into the plenum chamber 14 wherein it is heated so as to vibrationally excite the nitrogen. It then passes through the throat 16 and into the optical cavity 22. $CO_2$ from the source 24 is passed through the ducts 26 and injected into the stream of excited nitrogen. Due to the rapid expansion of the nitrogen in the expansion area 18, the nitrogen is thrown out of thermal equilibrium, and therefore, is capable of imparting a large amount of vibrational energy to the $CO_2$ through resonant collisions without delivering thermal energy (heat) to the $CO_2$ or the lasing region. The $CO_2$ therefore assumes a high population inversion in the upper laser level (001). The existence of a large population inversion within the optical cavity 22 results in a stimulated, intense, rapid emission of photons resulting in a shift in energy state from the 001 level, which is called the upper laser level, to the 100 level, which is called the lower laser level.

The optical system represented by 22 in FIG. 1 may be chosen from among a number of optical systems known to the prior art. The detailed nature of the optical system is not germane to the present invention.

Figure 3:
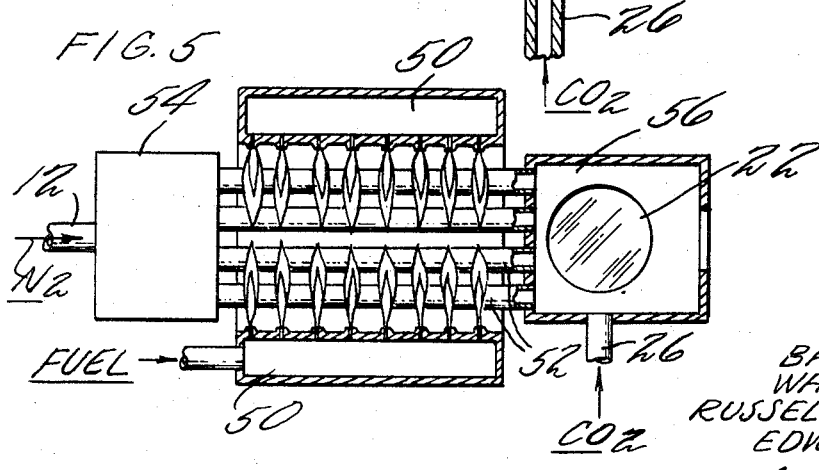
FIG. 3 is a simplified, side elevation of a variation of the embodiments of FIGS. 1 and 2 utilizing an electric arc.
Figure 3:
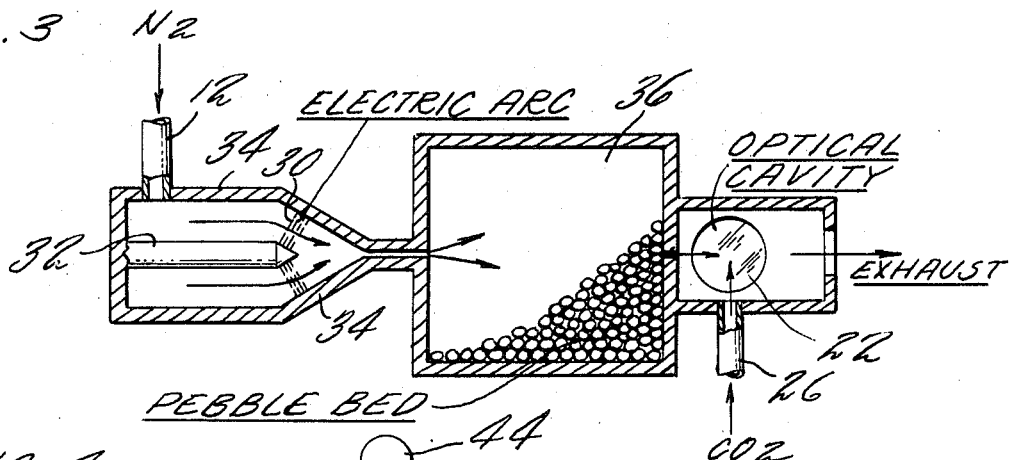

Referring now to FIG. 3, one embodiment of the present invention may utilize an electric arc 30 in order to heat the nitrogen. The arc may be formed between a conducting rod 32 and metallic surfaces 34; when an electric arc is used for heat, it may not only heat the nitrogen, but may also impart selective excitation to vibrational levels as a result of electron collisions (as in a discharge). However, the primary energy transfer is a result of heat, and the incidental electrical excitation which may take place is not harmful. The nitrogen, after being heated by the arc, may pass through a pebble bed 36 which more uniformally distributes the heat throughout all of the molecules of the nitrogen. Other suitable plenum arrangements may be used in lieu of the pebble bed 36 or the plenum may be omitted. The nitrogen flows out of the pebble bed 36 and in front of the optical cavity 22 where carbon dioxide is injected into the stream of energized nitrogen via ducts 26. In the exemplary embodiment of FIG. 3, no nozzle is provided; this illustrates the fact that laser operation utilizing the mixing technique of the present invention may be achieved without the use of an expansion nozzle. However, in many applications the use of a nozzle (as shown in FIGS. 1 and 2) is to be preferred because of the greater population inversion which is achievable through the nitrogen/$CO_2$ collisions when the nitrogen is thrown out of equilibrium by means of rapid expansion, and because this expansion maintains the optical cavity area cooler than is the case without an expansion nozzle.

Figure 4:
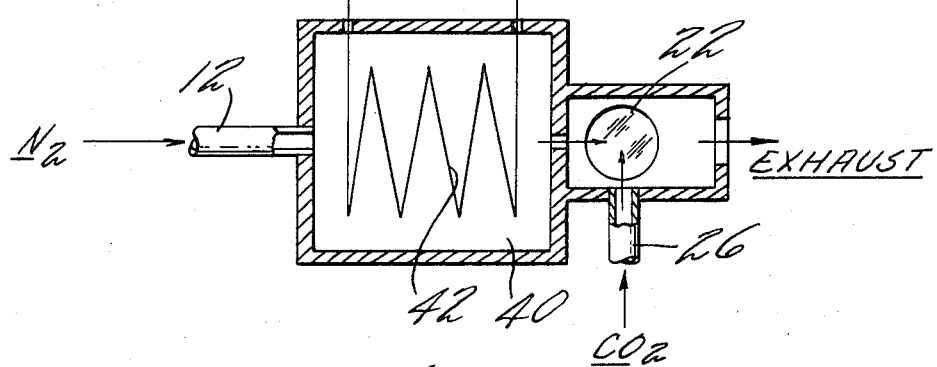
FIG. 4 is a simplified, sectioned side elevation of a further variation of the embodiments of FIGS. 1 and 2 utilizing electrical conduction as a source of heat.

Referring to FIG. 4, the nitrogen may alternatively be heated in a plenum 40 containing an electric heating coil 42 which is energized by a suitable source 44.

As shown in FIG. 5, one useful embodiment of the present invention incorporates a heat exchanger in which a burner 50 is in heat exchange relationship with a plurality of tubes 52 between first and second headers 54, 56 so that nitrogen flowing from the duct 12 through the header 54 and tubes 52 is brought to a very high temperature as a result of the heat from the burner 50. Any form of known heat exchanger (in addition to those illustrated in FIGS. 4 and 5 may be used.

Figure 6:
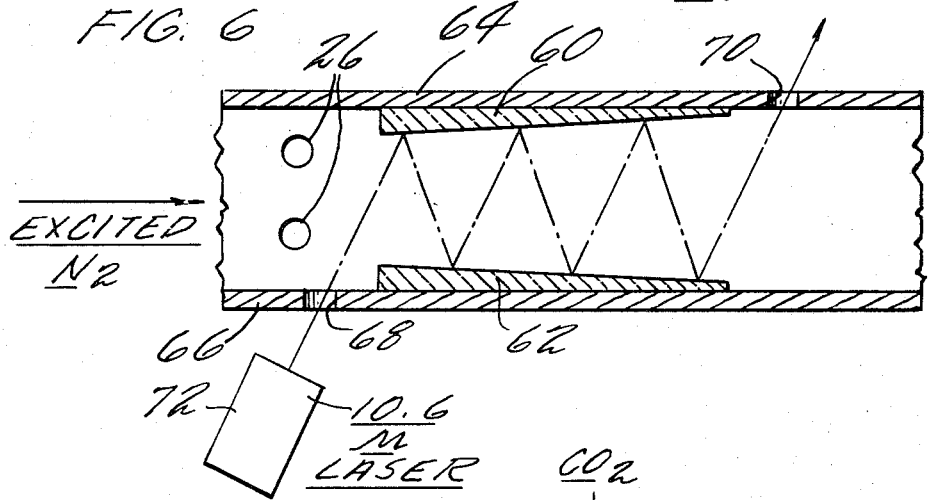
FIG. 6 is a plan view of an embodiment illustrating the invention in an amplifier-type laser.

In FIG. 6 is illustrated the fact that, although the embodiments of FIGS. 1 through 5 are illustrative of oscillator-type lasers, the principles of the present invention may be utilized in a system of the amplifier type. Thus, the optical gain path may comprise an oscillator type of optical cavity or an amplifying mirror and window combination or cavity. In FIG. 6, instead of utilizing a biconfocal optical mirror set to collect the photons into a coherent beam of light which comprises the laser output, substantially parallel mirror surfaces 60, 62 are positioned between the sidewalls 64, 66 of a laser (FIG. 6 being a top view), with $CO_2$ injection ducts 26 being positioned just upstream of the mirror surfaces 60, 62. An input coupling aperture 68 and an output coupling aperture 70 are so positioned to permit a laser beam from a laser 72 (of the same wavelength as the photon emission which takes place within laser chamber 20) to enter the lasing region between the mirror surfaces 60, 62 and stimulate the emission of photons by the population-inverted carbon dioxide in the chamber 20. It is known that unstimulated (spontaneous) photon emission of the 10.6 micron wavelength laser transition in carbon dioxide takes about 4.7 seconds, whereas emission of photons from population-inverted carbon dioxide stimulated by light of the same wavelength takes on the order of magnitude of $10^{19}$ seconds. Thus, a very rapid, intense lasing action can take place in the embodiment of FIG. 6, which results in a high utilization of the available power in the population-inverted $CO_2$. The laser 72 may be any suitable form of external oscillator capable of emitting light at the same wavelength as that of carbon dioxide (10.6 microns). The laser 72 may comprise a conventional $CO_2$ gas laser, a number of which are commercially available.

Figure 7:
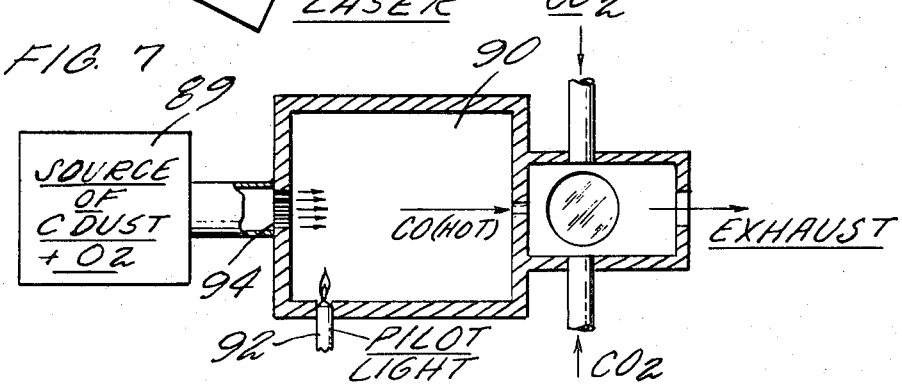
FIG. 7 is a simplified side elevation of yet another embodiment of the invention in which combustion provides the energizing gas and the excitation therefor.

As illustrated in FIG. 7, the present invention may also be practiced in conjunction with a system of the combustion type. For instance, carbon dust and oxygen from a source 89 may be mixed in a chamber 90 which includes a pilot flame 92 so as to initiate and stabilize combustion of the carbon and oxygen forced through the combustion inlets 94. The resultant product is carbon monoxide (CO) which is very hot. As is known, carbon monoxide is a useful energizing gas in a number of gas laser systems. For instance, it is substantially as effective as nitrogen in a system utilizing carbon dioxide as the lasing substance. As an alternative, the system of FIG. 7 may have carbon dust combusted with air which provides not only carbon monoxide but also nitrogen at the outflow, each of which are suitable energizing gases with respect to the carbon dioxide as a lasing substance. These two embodiments (burning carbon dust with either oxygen or air) are also useful in other laser systems. Similarly, other compounds or elements may be combusted in a chamber such as the chamber illustrated in FIG. 7 so as to provide both the energizing gas and the exciting energy for the energizing gas in a gas dynamic laser system incorporating the mixing concepts of the present invention. This is to be distinguished from certain combustion systems known in the prior art wherein both the lasing substance and the energizing gas are formed as products of the reaction, and losses due to prelasing relaxation processes are incurred since the excited energizing gas is intimately in contact with the lasing substance within the combustion chamber itself, as well as loss of other advantages of the present invention as described hereinbefore.

For maximum efficiency, as well as for maximum power output, it is preferable that the optical cavity be of such a size and so configured as to "see" as much of the inverted-population region as possible. In other words, the physical dimensions of the optical cavity relative to the flows and other parameters of the system in operation should be such as to collect as much stimulated photon emission as possible. This means that the cavity dimensions should extend along the length of flow coextensively with any significant amount of positive population inversion density.

As is well known in the art, depopulation of the lower lasing level of the lasing substance (such as the 100 level of carbon dioxide) may be enhanced by the addition of other substances into the lasing region. For instance, in the nitrogen-carbon dioxide laser, the lower laser level or carbon dioxide is caused to decay more rapidly to the ground state and to other low level states by the addition into the flow of nitrogen or into the flow of carbon dioxide of helium or water vapor. The present invention is not dependent upon this gaseous flow, but utilization of the invention can be enhanced by the use thereof according to the teachings of the prior art. Therefore, the use of these catalytic-type gases has been omitted from the disclosure herein for simplicity but it should be understood that the invention, as pointed out in the appended claims is equally applicable to systems that use any of these sorts of catalytic gases as well as to systems which use none.

It should be understood that the present invention relates to the manner in which population inversion of the lasing substance is achieved relative to the energizing gas: that is, the lasing substance is caused to be mixed with the energizing gas at the point in the system where stimulated photon emission (lasing) is usefully to take place.

The embodiments herein are described with respect to exemplary gas laser systems, to wit, $N_2$-$CO_2$, $CO$-$CO_2$ and $N_2$/$CO$-$CO$. However, the principles of the present invention are equally applicable to systems such as nitrogen/nitrous oxide ($N_2$-$N2O$), carbon monoxide/carbon dioxide, a mixture of carbon monoxide nitrogen/carbon dioxide, and other gaseous systems, utilizing vibrational energy states, as well as systems, such as helium-neon, which transfer energy in electronic states. Also, the lasing substance may be in solid form as it enters the laser, as described and claimed in the aforementioned copending C. M. Banas et al. application. Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

We claim:

1. In the production of laser radiation within the optical cavity of a gas laser, the steps of:
   providing a gas including at least a molecular energizing gas;
   heating said gas to provide said molecular energizing gas in a highly energized state substantially in thermal equilibrium;
   rapidly cooling said heated gas thereby substantially freezing the population of states in said gas, said gas being over-populated in at least one state other than the ground state, including at least one vibrational state of said energizing gas;
   flowing the expanded gas through an optical gain path; and
   injecting a lasing substance, having an upper laser level of energy characterized by a vibrational state at a frequency nearly resonant with said vibrational state of said energizing gas, into the energizing gas flow, within said optical cavity, whereby vibrational energy is preferentially transferred from said energizing gas into said upper laser level of said lasing substance by near-resonant collisions between said gases.

2. The method according to claim 1 wherein the step of rapidly cooling comprises flowing and heated gas through a sudden expansion nozzle.

3. The method according to claim 2 wherein the step of flowing the expanded gas through an optical gain path comprises flowing said gas through an optical gain path transversely of the optical axis thereof.

4. The method according to claim 2 wherein the step of flowing the expanding gas through an optical gain path comprises flowing said gas through an optical gain path transversly of the optical axis thereof.

UNITED STATES PATENT OFFICE
CERTIFICATE OF CORRECTION

Patent No. 3,571,747    Dated March 23, 1971

Inventor(s) Barry R. Bronfin, Wayne G. Burwell, Russell G. Meyerand, Jr. and Edward N. Hall It is certified that error appears in the above-identified patent and that said Letters Patent are hereby corrected as shown below:

Claim 2, column 6, line 36, change "and" to -- said --

Claim 3, column 6, line 38, change "2" to -- 1 --

Signed and sealed this 22nd day of June 1971.

(SEAL)
Attest:

EDWARD M. FLETCHER, JR.
Attesting Officer

WILLIAM E. SCHUYLER, JR.
Commissioner of Patents